Oct. 20, 1970     D. R. RORER     3,534,521
VACUUM SYSTEM FOR SKIN-PACKAGING MACHINES
Filed Oct. 18, 1968
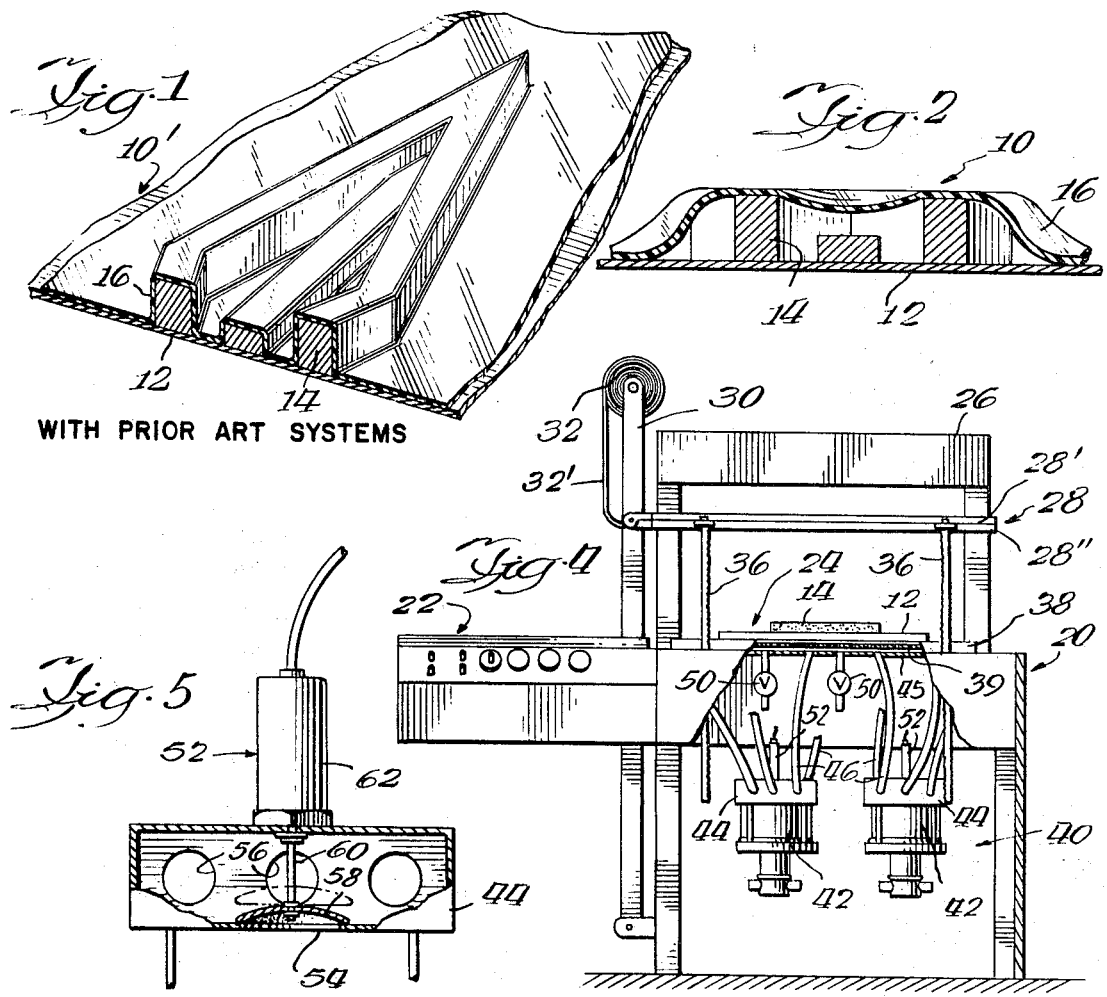
WITH PRIOR ART SYSTEMS
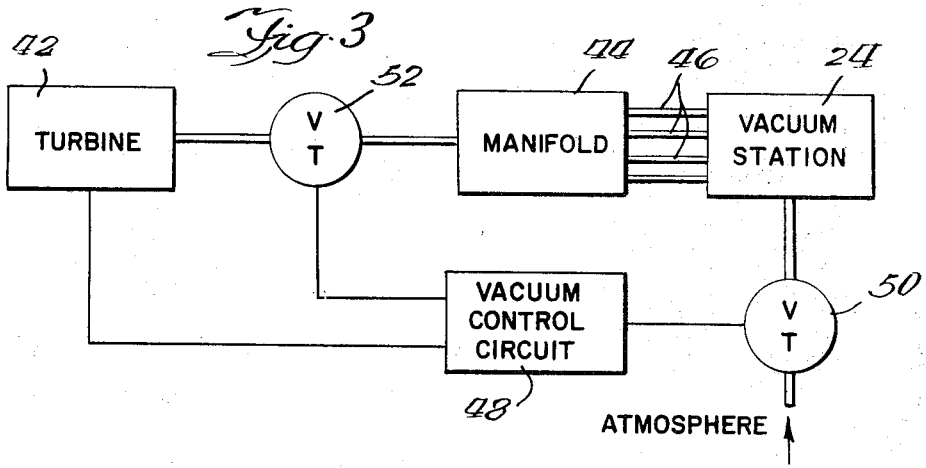
INVENTOR
Donald R. Rorer
BY Silverman & Cass
ATTORNEYS United States Patent Office 3,534,521
Patented Oct. 20, 1970

3,534,521
VACUUM SYSTEM FOR SKIN-PACKAGING MACHINES
Donald R. Rorer, Lake Bluff, Ill., assignor to Stone Container Corporation, Chicago, Ill., a corporation of Illinois
Filed Oct. 18, 1968, Ser. No. 768,853
Int. Cl. B65b 31/00
U.S. Cl. 53—22                                                         10 Claims

ABSTRACT OF THE DISCLOSURE

An air-evacuating system for a skin-packaging machine wherein a softened sheet of plastic film is vacuum-formed over an article mounted on a substrate, the machine having a vacuum station at which the substrate is supported. The system includes a source of vacuum and means to control the degree of vacuum-forming of the plastic film such that desired laminar engagement of the film with the substrate is achieved which is less than complete and total sheathlike engagement with the article, i.e., is arranged in a so-called "tented" or drape formation over the article packaged as distinguished from a substantial wrapping around the surfaces of the article projecting above the substrate. The control means or apparatus is operative to selectively interrupt communication between the source of vacuum and the vacuum station, while venting said station to ambient atmosphere. Also, the control apparatus can be adjusted to achieve any desired degree of "tenting" or draping of the film relative to the article to be packaged.

BACKGROUND OF INVENTION

This invention relates generally to an improved vacuum system for a skin-packaging machine or the like. More particularly, the invention is concerned with a vacuum system that employs apparatus to control the extent to which the plastic sheet material is drawn or draped over the article to be packaged, to wit, how close to the lateral edges of the article the film is caused to be positioned in the final packaging thereof. This degree of draping is called "tenting" or "tented" in this specification.

The basic procedure in all skin-packaging techniques are substantially the same. First, the article or articles to be packaged are placed on a base pad or substrate which may be coated with an adhesive or chemically conditioned to assure adhesion of the plastic sheet or film to the surface thereof, or the film used may be of the type which is self-adhering, or a combination of both may be used. The pad or substrate is supported on an air pervious surface at the vacuum station of the skin-packaging machine and a vacuum source is connected with the vacuum station for withdrawing air through said surface for vacuum-forming of the plastic film previously heat-softened by suitable oven or heater on the machine overlying the vacuum bed. The softened film is draped over the article-carrying substrate and the source of vacuum activated to evacuate the volume of space below the film, thus drawing the film about the article into laminar engagement with the exposed surface areas of the substrate.

With the prior art air-evacuating systems, the film was drawn into tight sheathlike engagement around the article so as to substantially envelop all lateral surfaces above the substrate. While this arrangement was acceptable for packaging of many articles, this tight, sheathlike engagement of the film with the article precluded its use in certain situations. If the article to be packaged was delicate or frangible such that it was unable to withstand even moderate forces exerted against it, such prior skin-packaging techniques could not be employed, because the force exerted by the film during vacuum-forming normally could be sufficient to damage or crush the article. Also, if the article had rather abrupt edges or sharp corners, the film could be ruptured or torn by said corners or edges during vacuum-forming.

In addition, when articles such as wall plaques or the like having somewhat irregular or intricate shapes, are packaged using prior art systems, certain problems are encountered. This type of article generally employs scalloping or other fanciful trim which gives rise to openings or depressions in the article. When packaged, the film will be caused to adhere to the substrate areas approximate these openings or depressions, as well as to the area about the periphery of the article. Accordingly, subsequent removal of plastic film is difficult and quite bothersome to the purchaser.

A prior attempt to solve some of the problems discussed above, is evidenced by U.S. Pat. 2,892,294, issued to H. W. La Branche on June 30, 1959. Generally, a machine such as taught in La Branche Pat. 2,892,294, normally employs a vacuum tank as a source of vacuum and a valve to control both the rate of application and the strength of the vacuum employed. However, even with this apparatus, only the aforementioned sheathlike engagement could be attained. In addition, to achieve the proper valve setting, numerous trial runs were required which resulted in lost time and a considerable number of unacceptable packages. Also, when a low-strength, slowly applied vacuum is used, the force tending to bring the sheet material into laminar engagement with the substrate correspondingly is weak. Therefore, there is likelihood of a defective package being obtained due to poor film-to-substrate adhesion.

In addition to the vacuum-tank arrangement of said La Branche patent, vacuum turbines were employed. Such turbine systems are advantageous because they remove a large volume of air from the vacuum station in a rather short period of time. Such a system is illustrated in U.S. Pat. 3,777,770 issued to Donald R. Rorer. Although it would appear superficially that to achieve the desirable tenting effect discussed previously it would be necessary only to de-energize the turbine at a predetermined point in the forming operation, such is not the case. Since the inertia of the turbine will cause it to override its de-energization, that is, the turbine continues to rotate, drawing a vacuum for a considerable period of time makes control of a final package substantially impossible.

SUMMARY OF THE INVENTION

The present invention provides a novel air-evacuating system for skin-packaging machines which includes control apparatus to achieve tenting of the plastic film so as to eliminate the problems discussed herein with respect to certain kinds of packaged articles. The control apparatus includes means that abruptly disconnect the source of vacuum from the vacuum station, while concurrently venting said station to the atmosphere, thus quickly and accurately terminating the vacuum forming of the plastic sheet material at a predetermined point.

3

BRIEF DESCRIPTION OF THE DRAWING

FIG. 1 is a partial perspective view of a package made with prior art systems, the package being sectioned to illustrate the engagement of the plastic sheet material with the substrate and article, respectively;

FIG. 2 is a partial sectional view of a package made using the novel air-evacuating system embodying the invention;

FIG. 3 is a schematic illustration of said vacuum system associated with the vacuum station of a skin-packaging machine;

FIG. 4 is a front elevational view of a skin-packaging machine embodying the invention and having a portion of the cabinet broken away to illustrate a preferred embodiment of said invention; certain elements or apparatus which normally would be housed within the cabinet are omitted for purposes of clarity;

FIG. 5 is a partial sectional view of a manifold and valve arrangement of one type which may be used in conjunction with the present invention.

DETAILED DESCRIPTION OF THE ILLUSTRATED EMBODIMENT

Referring now to the drawings, in FIG. 1 is illustrated a package of a type obtained with prior art systems, while in FIG. 2 is illustrated a package of the same article as in FIG. 1 achieved with the herein invention. The package of FIG. 2 is designated generally as 10, while that of FIG. 1, is designated 10′. Basically, the respective packages are comprised of the same elements, namely, a base pad or substrate 12 upon which the article 14 is mounted, and a thin sheet of plastic film 16 encasing the article.

Considering now to the differences between the packages 10′ and 10, the plastic film or sheet 16 of package 10′ is in laminar engagement with the substrate 12 and is in sheath-like engagement with the article 14. As was discussed previously, this sheathlike engagement of the plastic sheet 16 with the article 14 gives rise to the following problems; damage to the article; rupture or puncturing of the sheet material by the abrupt edges or corners of article 14; difficulty in removal of the plastic sheet material due to the adhesion of the sheet material to all of the exposed areas of the substrate 12. On the other hand, with the package 10 of FIG. 2, the sheet 16 is vacuum-formed only to such an extent as to achieve the required laminar engagement with the substrate 12 in the areas approximate the outer periphery of article 14. Accordingly, the forming operation is controlled so that complete or substantially complete sheathlike engagement of the material 16 with article 14 is precluded. Thus, since the sheet material 16 is tented or draped over the article 14, the abovementioned problems are obviated. Importantly, as will be evident from the description of the vacuum system to follow, these results are obtained even though the initial forming of the sheet material is effected with a relatively high strength vacuum so as to ensure proper adhesion of the plastic film to substrate 12.

A machine 20 employing the invention is illustrated in FIG. 4, said machine being of the general type disclosed in U.S. Pat. 3,777,770, although the invention is not limited thereto. Machine 20 includes a loading station 22, a vacuum station 24, a stationary heating assembly 26, a vertically movable two-piece drape frame 28, and a boom 30 for supporting a roll of plastic sheet material 32. In operation, the sheet material 32′ is clamped between the upper and lower elements 28′ and 28″ of the drape frame 28. Drape frame 28 is then raised to the heating position immediately below the heating assembly 26 by means of the rack gears 36 affixed to the lower element 28″. The rack gears 36 are engaged by suitable drive means (not shown) which includes a reversible motor so that the drape frame 28 may be raised and lowered as desired. While the drape frame 28 is in the elevated position, the substrate 12 and associated article 14 are advanced from the loading station 22 to the vacuum station 24 by infeed means (not shown) or manually. The vacuum station 24 includes a vacuum bed 38 which has a pervious upper surface 39 upon which the substrate 12 is supported. After the section of sheet material is heated to the desired temperature, the drape frame 28 is lowered into surrounding engagement with the vacuum bed 38 so as to drape the heated sheet material over the article 14 and substrate 12. At this point, the vacuum-producing apparatus 40 is activated to draw the sheet 16 down over article 14 and into laminar engagement with substrate 12, the drawing or forming of sheet 16 being controlled to achieve the tented package 10, illustrated in FIG. 2.

Basically, the vacuum or air-evacuating system of the present invention comprises the vacuum producing apparatus 40, a conduit system which connects apparatus 40 with the vacuum station 24, and control apparatus to effect the desired cycle of operation. While the apparatus 40 in the illustrated embodiment includes vacuum turbines 42, other forms may be employed. Each turbine 42 communicates with or is connected to the vacuum station 24 by means of tube members 46 which comprise a portion of said conduit system. In addition, the conduit system includes a manifold 44 positioned atop each turbine 42, the tube members 46 providing paths of communication between the apertured lower surface 45 of the vacuum bed 38 and said manifolds. Thus, the vacuum drawn by turbines 42 can be distributed over the entire area of the vacuum station 24, due to its application via manifolds 44 and tubes 46.

To attain control of the forming operation, operative communication between the turbine 42 and vacuum station 24 is interrupted, while concurrently the station is vented to atmosphere. This result is achieved by providing the air-evacuating system with selectively operable control apparatus. The system, including said control apparatus is illustrated schematically in FIG. 3 in association with the vacuum station of a skin-packaging machine. The control apparatus comprises two separate and distinct valve arrangements and the vacuum control circuit 48 which operates said arrangements. One of said arrangements is associated with the lower surface 45 of the vacuum bed 38 and is comprised of valves 50, which will vent vacuum station 24 to the atmosphere when in opened condition. The other valve arrangement includes valves 52 which are designed to interrupt operative communication between turbines 42 and the vacuum station 24 when closed. Also, if desired, the control apparatus may be used to de-energize turbines 42, or said turbines can be set for a specific operating period determined by the overall control system.

In the discussed embodiment, valve 52 is mounted atop the manifold 44, one form of this arrangement being illustrated in FIG. 5. Manifold 44 is positioned with respect to its respective turbine 42 such that outlet port 54 communicates with said turbine, the tubes 46 being connected to the inlet ports 56. The valve 52 is positioned or mounted to the upper surface of the manifold 44 and comprises a flexible cup-shaped diaphragm 58 affixed to one end of a reciprocal rod 60 which is operated by an actuating member 62. Accordingly, when diaphragm 58 is in the position illustrated in phantom in FIG. 5, outlet port 54 will be unobstructed, while when diaphragm 58 is in the position illustrated in full line, port 54 is blocked and interruption of the operative communication between turbine 42 and vacuum station 24 is realized. The actuating member 62 may be one of various suitable types, for example, a solenoid or a double-acting fluid piston arrangement, the specifics of which are well-known in the art and immaterial to the present invention.

Operation of the vacuum system of the present invention in the overall packaging cycle of machine 20 is best understood by reference to both the schematic representation of FIG. 3 and the specific embodiment of FIG. 4. After the sheet material 32′ is clamped in position by drape frame 28 and said frame raised to the heating position, the infeed mechanism of the machine (not shown) advances a substrate and associated article to the vacuum station 24. At this stage, the timers, relays, and other apparatus of the overall control system for machine 20 regulate the heating cycle to ensure that the sheet material 32' reaches the proper forming temperature. Once the proper forming temperature is reached, drape frame 28 is automatically lowered into surrounding engagement with the vacuum bed 38, draping the heated sheet material 32' over the substrate and associated article. At sometime immediately prior to or simultaneous with the last-mentioned draping operation, the vacuum-producing means 40 is actuated to commence vacuum drawing of the sheet material about the substrate and encased article. At this time, the vacuum control circuit 48 is activated and after expiration of a predetermined time, the control circuit 48 automatically performs the following steps: (a) shuts off turbines 42; (b) actuates valve 52 to block communication between turbine 42 and manifold 44; and (c) opens the valves 50 to vent the vacuum station to atmosphere. Thus, it can be seen that as soon as the vacuum control circuit performs the above-mentioned steps, the vacuum drawing or forming operation is terminated instantaneously, and the desired tenting of the sheet material may be achieved.

In practice, the control apparatus for the entire machine will include a vacuum-control circuit 48 discussed above as well as additional relay switches, circuitry, etc. for controlling the other operations of the packaging machine cycle. Thus, the elements of the overall control system may be adjusted to attain any sequence of operation desired, and if desired, the vacuum control circuit 48 may be by-passed so that vacuum forming may proceed to point where sheathlike engagement of the film with the article is achieved.

The invention has been particularly pointed out in the claims appended hereto. It is intended and envisioned that various equivalent structures may be employed for that specifically discussed with respect to the illustrated embodiment without departing from the spirit and scope of the invention.

What is claimed is:

1. In a skin-packaging machine having a vacuum station at which an article mounted on a substrate is encased with a sheet of plastic material which is vacuum-formed thereover into laminar contact with said substrate an air-evacuating system for effecting the forming of said sheet, said system comprising: at least one vacuum turbine associated with said vacuum station for withdrawing air therefrom; and control means for selectively placing the vacuum turbine in operative communication with the vacuum station, said control means including valve means associated with the vacuum station and adapted when in the opened condition to vent said station to atmosphere, said valve means being independent of said vacuum turbine such that during forming of said sheet, the operative communication of the vacuum turbine with the vacuum station may be interrupted and said valve means opened to admit air under atmospheric pressure to said vacuum station, whereby the vacuum forming of said sheet may be controlled to effect the required laminar contact of said sheet with the substrate while precluding sheathlike engagement of said sheet with the article.

2. An air-evacuating system as defined in claim 1 which includes conduit means connecting said vacuum turbine to the vacuum station, said control means including additional valve means associated with said conduit means and adapted to effect said interruption of the operative communication between the vacuum turbine and the vacuum station.

3. In a skin-packaging machine having a vacuum station at which an article mounted on a substrate is encased with a sheet of plastic material which is vacuum-formed thereover into laminar contact with said substrate, an air-evacuating system for effecting the forming of said sheet, said system comprising: vacuum-producing means associated with said vacuum station for withdrawing air therefrom; and control means for selectively placing the vacuum-producing means in operative communication with the vacuum station, said control means including valve means associated with the vacuum station and adapted when in the opened condition to vent said station to atmosphere, said valve means being independent of said vacuum-producing means such that during forming of said sheet, the operative communication of the vacuum-producing means with the vacuum station may be interrupted and said valve means opened to admit air under atmospheric pressure to said vacuum station; conduit means connecting said vacuum-producing means to the vacuum station; said control means including additional valve means associated with said conduit means and adapted to effect said interruption of the operative communication between the vacuum-producing means and the vacuum station; and said conduit means including a manifold which comprises a plurality of inlet ports in communication with said vacuum station, and an outlet port associated with said vacuum-producing means, said additional valve means being carried by said manifold and operable to block said outlet port, whereby the vacuum forming of said sheet may be controlled to effect the required laminar contact of said sheet with the substrate while precluding sheathlike engagement of said sheet with the article.

4. An air-evacuating system as defined in claim 1 wherein said control means comprises additional valve means disposed between the vacuum turbine and said vacuum station, said additional valve means being adapted, upon the operation thereof, to effect said interruption of the operative communication between the vacuum turbine and said vacuum station, and circuit means for effecting operation of the respective valve means.

5. An air-evacuating system as defined in claim 4 wherein said circuit means is associated with an operable to de-energize said vacuum turbine.

6. A method of forming a package wherein an article mounted on a substrate is encased with a sheet of plastic material, said material being brought into laminar contact with the substrate by a vacuum forming operation, such that sheathlike engagement of said sheet with the article is not realized, said method comprising the steps of; subjecting the sheet material to a pressure differential in order to initiate the vacuum forming operation, terminating subjection of the sheet to continued vacuum forming at a predetermined point in the forming operation, and concurrently therewith venting the space thus enclosed by the sheet material and the substrate to the atmosphere.

7. A method of vacuum-forming a packing, wherein an article mounted on a substrate is encased in plastic, by employing an apparatus which includes a vacuum station; vacuum-producing means in communication with said station; a first normally closed valve means associated with said station and adapted to vent said station to atmosphere; and a second normally open valve means associated with the vacuum station and vacuum-producing means, said second valve means capable of interrupting the operative communication between said station and said vacuum-producing means; the method comprising the steps of:

(a) providing at said station a substrate carrying an article having a heat-softened plastic sheet draped thereover;

(b) initiating the vacuum-forming operation by activating the vacuum-producing means; and (c) terminating the vacuum-forming operation before the plastic sheet engages the article in a sheathlike manner (i) by opening said first valve means to vent the vacuum station to atmosphere and
(ii) by closing said second valve means to interrupt the operative communication between the vacuum-producing means and vacuum station.

8. The method as recited in claim 7 wherein the vacuum-producing means is de-activated so as to also terminate the vacuum-forming operation.

9. The method as recited in claim 7 wherein said first and second valve means are operated simultaneously.

10. The method as recited in claim 9 wherein the vacuum-producing means is de-energized at the same that said first and second valve means are operated.

References Cited
UNITED STATES PATENTS 2,892,294   6/1959   LaBranche _____ 53—112

TRAVIS S. McGEHEE, Primary Examiner

U.S. Cl. X.R.

53—112